United States Patent
Ishikawa (10) Patent No.: US 11,676,738 B2
(45) Date of Patent: Jun. 13, 2023

(54) ELECTRO-OPTICAL DEVICE WITH ION-ADSORBING ADSORPTION FILM IN CONTACT WITH SEALING MATERIAL AND ELECTRONIC APPARATUS HAVING THE SAME

(71) Applicant: SEIKO EPSON CORPORATION, Tokyo (JP)

(72) Inventor: Tomoya Ishikawa, Sapporo (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 17/678,035

(22) Filed: Feb. 23, 2022

(65) Prior Publication Data
US 2022/0270778 A1   Aug. 25, 2022

(30) Foreign Application Priority Data
Feb. 25, 2021  (JP) .............................. JP2021-028267

(51) Int. Cl.
*G21K 1/10* (2006.01)
*G02F 1/1337* (2006.01)
*G02F 1/1339* (2006.01)

(52) U.S. Cl.
CPC ............. *G21K 1/10* (2013.01); *G02F 1/1337* (2013.01); *G02F 1/1339* (2013.01); *G02F 1/133715* (2021.01); *G02F 1/133719* (2013.01); *G02F 1/133726* (2021.01); *G02F 1/133734* (2013.01); *G02F 1/133738* (2021.01); *G02F 1/133742* (2021.01); *G02F 1/133761* (2021.01)

(58) Field of Classification Search
CPC combination set(s) only.
See application file for complete search history.

(56) References Cited

U.S. PATENT DOCUMENTS 6,493,058 B1 * 12/2002 Han .................... G02F 1/13392
349/155

FOREIGN PATENT DOCUMENTS

| JP | 2000-284300 | 10/2000 | |
| JP | 2003-233075 | 8/2003 | |
| JP | 2020-46574 | * 3/2020 | ........... G02F 1/1337 |
| JP | 2020-046574 | 3/2020 | |

* cited by examiner

*Primary Examiner* — Lauren Nguyen
(74) *Attorney, Agent, or Firm* — JCIPRNET (57) ABSTRACT

A liquid crystal device includes: an element substrate; a counter substrate disposed opposite to the element substrate; a sealing material disposed between the element substrate and the counter substrate; and a liquid crystal layer disposed on an inner side of the sealing material and containing liquid crystal. The element substrate includes an alignment film configured to align the liquid crystal and an ion-adsorbing first adsorption film disposed in contact with the sealing material. The alignment film includes a first vapor-deposited film and a second vapor-deposited film disposed between the first vapor-deposited film and the liquid crystal layer. The second vapor-deposited film and the first adsorption film include a column of which a long axis direction intersects a thickness direction of the liquid crystal layer. A thickness of the first adsorption film is thicker than a thickness of the second vapor-deposited film.

11 Claims, 8 Drawing Sheets

ELECTRO-OPTICAL DEVICE WITH ION-ADSORBING ADSORPTION FILM IN CONTACT WITH SEALING MATERIAL AND ELECTRONIC APPARATUS HAVING THE SAME

The present application is based on, and claims priority from JP Application Serial Number 2021-028267, filed Feb. 25, 2021, the disclosure of which is hereby incorporated by reference herein in its entirety.

BACKGROUND

1. Technical Field

The present disclosure relates to an electro-optical device and an electronic apparatus.

2. Related Art

Traditionally, as optical modulation devices, projectors that use electro-optical devices such as liquid crystal devices have been known. In such projectors, the luminous flux density incident on the liquid crystal device is greater compared to that in the case of direct view-type liquid crystal devices. Furthermore, due to increase in the brightness of light sources such as those for projection mapping, ionic impurities originating from sealing materials or the like easily elute into the liquid crystal layer of liquid crystal devices. Ionic impurities can stagnate in the liquid crystal layer to induce a disruption in the alignment of liquid crystals and a decrease in the driving speed and the voltage holding ratio, and can be a factor in decreasing display quality of liquid crystal devices.

For example, JP-A-2020-46574 discloses liquid crystal device including a first inorganic alignment film in contact with a liquid crystal layer, and a first inorganic insulating film disposed relative to the liquid crystal layer with the first inorganic alignment film interposed therebetween. In the liquid crystal device, the first inorganic insulating film is formed by a vacuum vapor deposition method along the thickness direction of the liquid crystal layer, while the first inorganic alignment film is formed by diagonal vapor deposition using an ion-assisted vapor deposition method. In the liquid crystal device having such a form, making the thickness of the first inorganic insulating film thicker than the thickness of the first inorganic alignment film tends to improve light resistance.

However, in the liquid crystal device of JP-A-2020-46574, when the thickness of the first inorganic insulating film is thicker than the thickness of the first inorganic alignment film, a stain-like display defect easily occurs in a corner of the display region. To describe in detail, when the thickness of the first inorganic alignment film is thinner than the thickness of the first inorganic insulating film, the ion adsorption property of the first inorganic alignment film decreases. The first inorganic alignment film containing silicon oxide or the like has an ion adsorption property, but its ion adsorption property is easily attenuated when thin in thickness. Therefore, ionic impurities eluting from the sealing material disposed surrounding the display region are less likely to be adsorbed by the first inorganic alignment film outside of the display region. When ionic impurities diffuse into the display region, a stain-like display defect easily occurs. In other words, there has been a demand for an electro-optical device that suppresses diffusion of ionic impurities in the liquid crystal layer.

SUMMARY

An electro-optical device includes: a first substrate including a pixel electrode, a second substrate that is disposed opposite to the first substrate with a sealing material interposed therebetween and that includes a common electrode, and a liquid crystal layer that is disposed between the first substrate and the second substrate and that contains liquid crystal, wherein the first substrate includes a first alignment film configured to align the liquid crystal and an ion-adsorbing first adsorption film disposed in contact with the sealing material, the first alignment film includes a first vapor-deposited film and a second vapor-deposited film disposed between the first vapor-deposited film and the liquid crystal layer, the second vapor-deposited film and the first adsorption film include a column of which a long axis direction intersects a thickness direction of the liquid crystal layer, and a thickness of the first adsorption film is thicker than a thickness of the second vapor-deposited film.

An electronic apparatus includes the electro-optical device described above.

BRIEF DESCRIPTION OF THE DRAWINGS

FIG. 4 is a schematic plan view illustrating a disposition of a first adsorption film, a second adsorption film, and the like.

FIG. 5 is a schematic cross-sectional view illustrating a configuration of a first adsorption film, a second adsorption film, and the like.

DESCRIPTION OF EXEMPLARY EMBODIMENTS

In each of the following drawings, X-, Y-, and Z-axes are given as coordinate axes orthogonal to one another as necessary. The directions indicated by the arrows are referred to as + directions, while the directions contrary to the + directions are − directions. The +Z direction may also be called upward, while the −Z direction may also be called downward. The view from the +Z direction is called plan view or planar. In addition, to illustrate each of layers or each of members at a recognizable size, the layers or the members are not necessarily drawn to scale.

Furthermore, for example, the expressions "relative to a substrate" and "on a substrate" represent either a case in which an article is disposed on and in contact with the substrate, a case in which an article is disposed above the substrate with another structure interposed therebetween, or a case in which a portion of an article is disposed on and in contact with the substrate while another portion of the article is disposed above the substrate with another structure interposed therebetween. Note that a thickness of a structure such as a film or a layer provided on a substrate refers to a distance in a direction along the Z-axis, which is the normal line direction of the substrate.

1. First Embodiment

In the present embodiment, an active drive-type liquid crystal device including a thin film transistor (TFT) will be illustrated as an example of an electro-optical device. A configuration of liquid crystal device 100 as an electro-optical device according to the present embodiment will be described with reference to FIGS. 1 to 3. FIG. 2 includes a line segment H-H' of FIG. 1, and illustrates a cross-section along the Y-Z plane. In FIG. 2, for the sake of convenience in illustration, the size and number of liquid crystals contained in the liquid crystal layer are different from the actual size and number.

Figure 1:
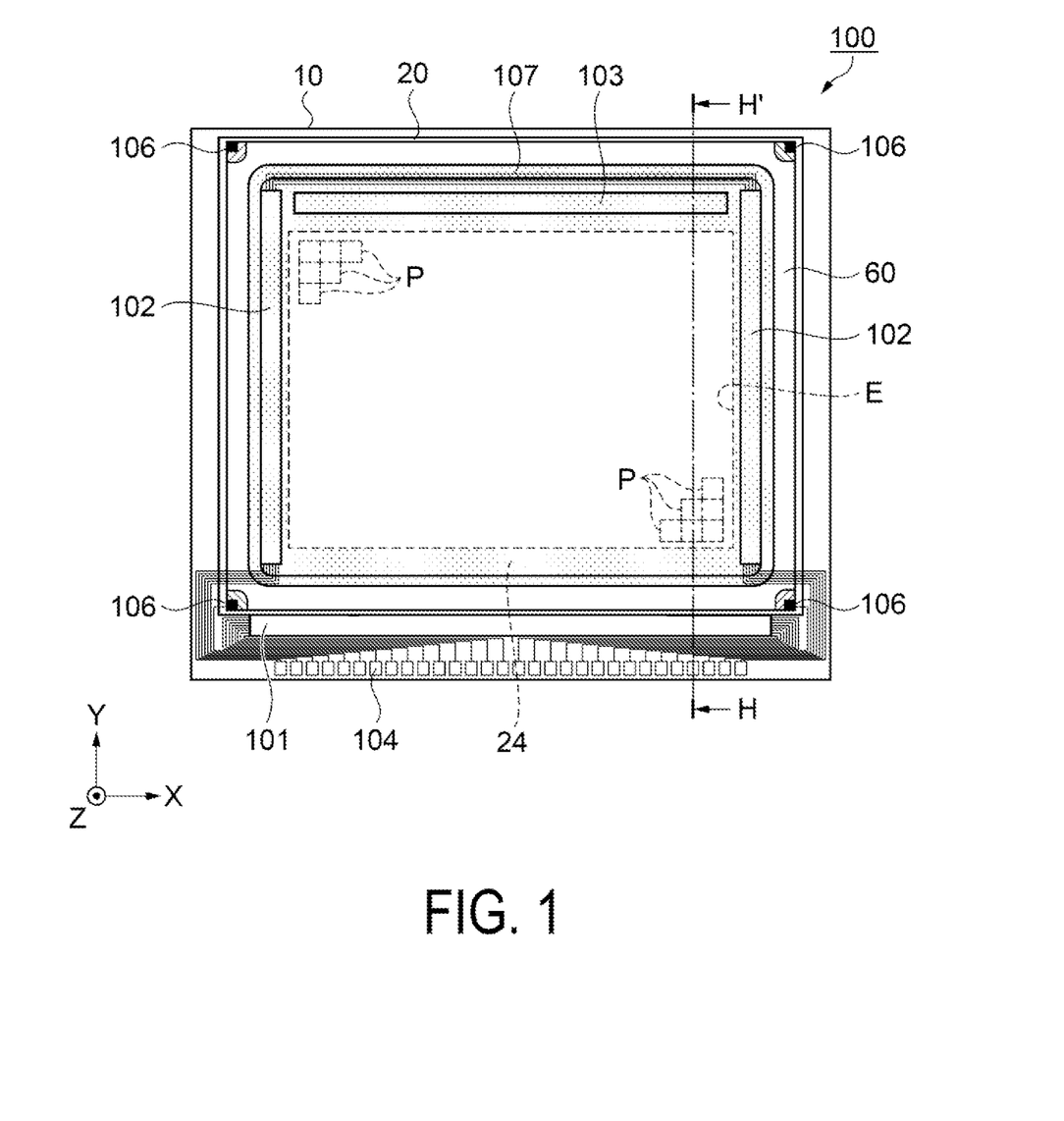
FIG. 1 is a schematic plan view illustrating a configuration of liquid crystal device as an electro-optical device according to a first embodiment.
Figure 2:
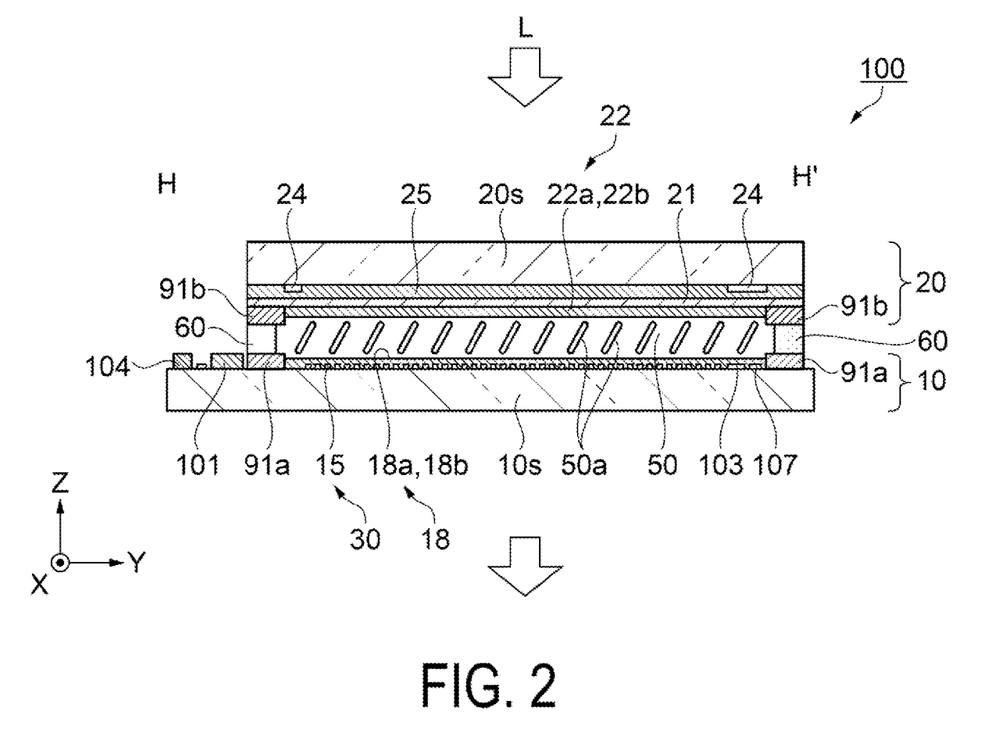
FIG. 2 is a schematic cross-sectional view illustrating a configuration of liquid crystal device.

As illustrated in FIG. 1, the liquid crystal device 100 includes an element substrate 10 serving as a first substrate, a counter substrate 20 serving as a second substrate, and a liquid crystal layer to be described later. The element substrate 10 and the counter substrate 20 are, in plan view, substantially rectangular. The element substrate 10 and the counter substrate 20 are overlaid on each other and joined to each other via a sealing material 60 disposed along an outer edge of the counter substrate 20. A display region E including a plurality of pixels P is provided on the inner side of the sealing material 60. The plurality of pixels P are disposed in a matrix in directions along the X-axis and the Y-axis.

The sealing material 60 contains resin having curability such as a thermosetting property or ultraviolet curability. As a result, after the raw material of the sealing material 60 is applied to the element substrate 10 and the counter substrate 20, the resin can be cured to form the sealing material 60 into a desired shape. The sealing material 60 contains ionic impurities originating from raw materials such as resin or resin curing agents. Such ionic impurities can elute into the liquid crystal layer. In the liquid crystal device 100 according to the present embodiment, diffusion of ionic impurities into the liquid crystal layer is restrained by the ion adsorption property of the first adsorption film and the second adsorption film to be described later.

The element substrate 10 includes a data line driving circuit 101, two scanning line driving circuits 102, an inspection circuit 103, and a plurality of external coupling terminals 104. The element substrate 10 is, in plan view, larger than the counter substrate 20. In the element substrate 10, the plurality of external coupling terminals 104 are provided in a region that does not overlap the counter substrate 20, while the data line driving circuit 101 is provided between the plurality of external coupling terminals 104 and the sealing material 60.

A partition portion 24 surrounding the display region E is provided between the sealing material 60 and the display region E. The partition portion 24 is substantially rectangular, with two sides along the Y-axis and the other two sides along the X-axis. The scanning line driving circuits 102 are disposed, in plan view, overlaid on the above-described two sides along the Y-axis. The two scanning line driving circuits 102 are electrically connected via wiring 107. Of the above-described two sides along the X-axis, the inspection circuit 103 is disposed, in plan view, overlaid on one side in the +Y direction. The inspection circuit 103 is electrically connected to a data line to be described later.

The data line driving circuit 101 and the two scanning line driving circuits 102 are electrically connected to the external coupling terminals 104. A vertical conduction portion 106 is provided at four corners of the counter substrate 20.

As illustrated in FIG. 2, the element substrate 10 and the counter substrate 20 are disposed opposite to each other and spaced apart from each other in a direction along the Z-axis with the sealing material 60 interposed therebetween. A liquid crystal layer 50 is disposed between the element substrate 10 and the counter substrate 20. The liquid crystal layer 50 is surrounded by the element substrate 10, the counter substrate 20, and the sealing material 60. The liquid crystal layer 50 contains liquid crystal 50a. The liquid crystal 50a has positive or negative dielectric anisotropy. In the present embodiment, liquid crystal 50a having negative dielectric anisotropy is employed. Here, the liquid crystal 50a refers to an individual liquid crystal molecule or a collection of individual liquid crystal molecules constituting the liquid crystal 50a.

The element substrate 10 includes a substrate 10s serving as a substrate body; a wiring layer including a TFT 30 serving as a transistor, and the like; a pixel electrode 15; an alignment film 18 serving as a first alignment film; and a first adsorption film 91a. In the element substrate 10, the substrate 10s, the wiring layer described above, and the pixel electrode 15 are disposed in this order toward the liquid crystal layer 50, with the alignment film 18 and the first adsorption film 91a provided further upward thereof.

The alignment film 18 has an upper surface facing the liquid crystal layer 50. The alignment film 18 is disposed between the pixel electrode 15 and the liquid crystal layer 50. The alignment film 18 includes a first vapor-deposited film 18a and a second vapor-deposited film 18b. The first adsorption film 91a has an ion adsorption property. "Ion adsorption property" refers to a property of capturing ionic impurities and the like in the liquid crystal layer 50. The first adsorption film 91a is disposed in contact with the sealing material 60. The first adsorption film 91a includes a region in contact with the lower surface of the sealing material 60 and a region facing the liquid crystal layer 50. An inorganic material such as silicon oxide is employed for the first adsorption film 91a.

The counter substrate 20 includes a substrate 20s serving as a substrate body, the partition portion 24, an insulating layer 25, a common electrode 21, an alignment film 22 serving as a second alignment film, and a second adsorption film 91b. In the counter substrate 20, the substrate 20s, the partition portion 24, the insulating layer 25, and the common electrode 21 are disposed in this order toward the liquid crystal layer 50, with the alignment film 22 and the second adsorption film 91b provided further in the −Z direction thereof.

The alignment film 22 has a lower surface facing the liquid crystal layer 50. The alignment film 22 is disposed between the common electrode 21 and the liquid crystal layer 50. The alignment film 22 includes a third vapor-deposited film 22a and a fourth vapor-deposited film 22b. The second adsorption film 91b has an ion adsorption property. The second adsorption film 91b is disposed in contact with the sealing material 60. The second adsorption film 91b includes a region in contact with the upper surface of the sealing material 60 and a region facing the liquid crystal layer 50. An inorganic material such as silicon oxide is employed for the second adsorption film 91b.

The alignment films 18 and 22 are formed based on an optical design of the liquid crystal device 100. The alignment films 18 and 22 have a function of aligning the liquid crystal 50a of the liquid crystal layer 50. The alignment state of the liquid crystal 50a changes depending on the voltage applied in accordance with image signals to be described later.

The alignment films 18 and 22 substantially vertically aligns the liquid crystal 50a having negative dielectric anisotropy. For example, an inorganic material such as silicon oxide is employed for the alignment films 18 and 22. The alignment film 18 is not limited to being constituted by two layers of the first vapor-deposited film 18a and the second vapor-deposited film 18b. The alignment film 22 is not limited to being constituted by two layers of the third vapor-deposited film 22a and the fourth vapor-deposited film 22b. The alignment films 18 and 22 may each have three or more layers.

The alignment films 18 and 22 gives a pretilt to the liquid crystal 50a to vertically align the same. The inclination direction of the pretilt is along a direction intersecting the X-axis and the Y-axis. When the liquid crystal layer 50 is driven, the liquid crystal 50a is given the pretilt and is vertically aligned relative to the alignment films 18 and 22, with the alignment state of the liquid crystal 50a being changed in the inclination direction described above. Repeatedly driving the liquid crystal layer 50 on and off causes the liquid crystal 50a to repeat the behavior of collapsing in the inclination direction of the pretilt and returning to the initial alignment state. Here, the alignment state in which the liquid crystal 50a having negative dielectric anisotropy is given a pretilt angle of less than 90° relative to the X-Y plane, along which the surfaces of the alignment films 18 and 22 are, and stands in a collapsed manner is referred to as substantially vertical alignment. Details of the alignment films 18 and 22, the first adsorption film 91a, and the second adsorption film 91b will be described later.

A plate having translucency and an insulating property such as a glass substrate or a quartz substrate, for example, is employed for the substrates 10s and 20s. In the present description, "translucency" means that a transmittance of visible light is greater than or equal to 50%.

The liquid crystal device 100 is of a transmissive type. Light L is incident from the +Z direction, which is the counter substrate 20 side, and is emitted from the element substrate 10 via the liquid crystal layer 50. When transmitted through the liquid crystal layer 50, the light L is modulated in accordance with the alignment state of the liquid crystal 50a. The incident direction of the light L relative to the liquid crystal device 100 is not limited to the one described above, and the light L may be incident from the element substrate 10. In addition, the liquid crystal device 100 is not limited to those of a transmissive type, and may be of a reflective type. For the liquid crystal device 100, an optical design of a normally white mode or a normally black mode is employed. The liquid crystal device 100 may include a polarizing element on an incident side and an emission side of the light L.

Figure 3:
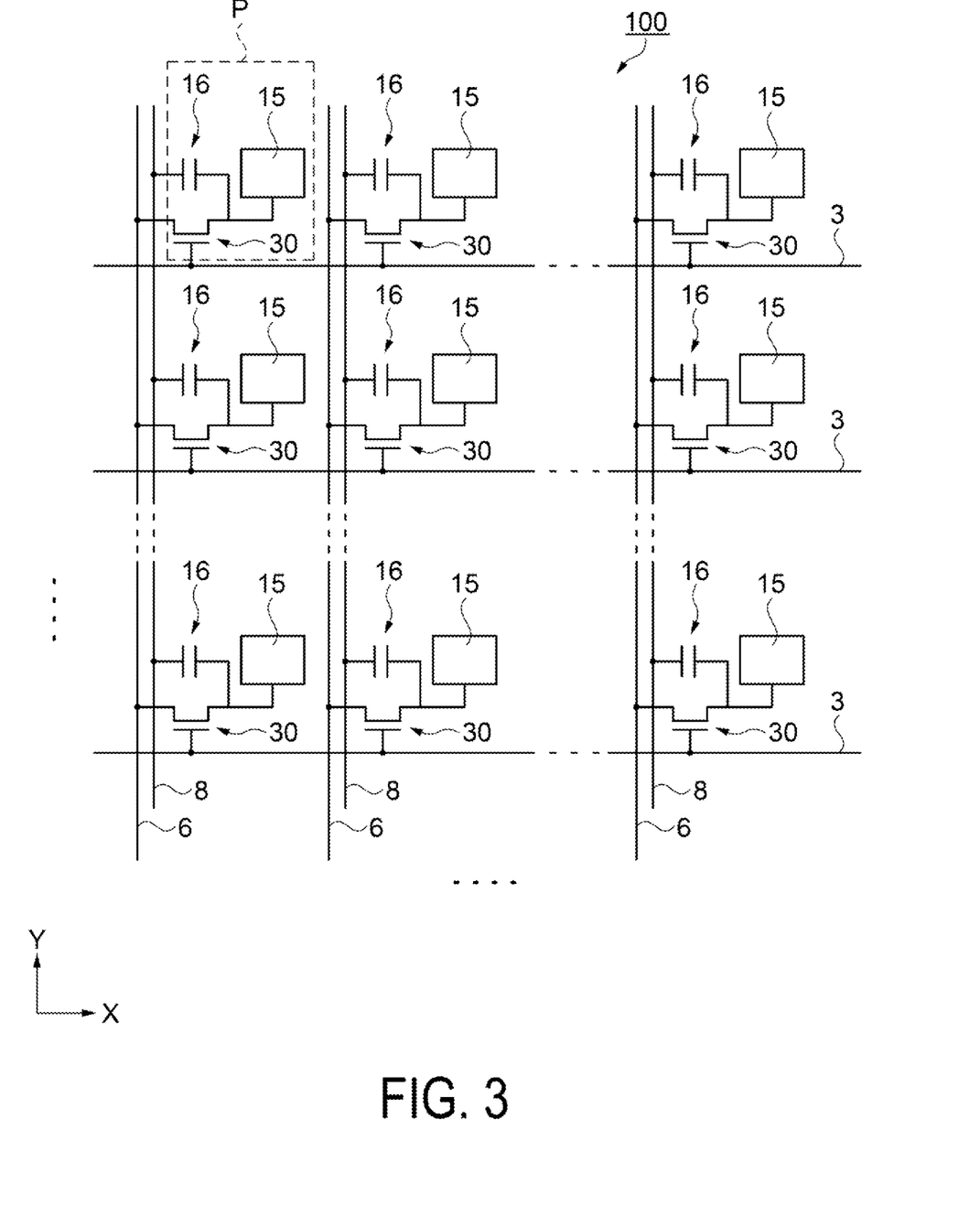
FIG. 3 is an equivalent circuit diagram illustrating an electrical configuration of liquid crystal device.

As illustrated in FIG. 3, the liquid crystal device 100 includes data lines 6, scanning lines 3, and capacitance lines 8, each in plurality, as signal wiring insulated from each other. The scanning lines 3 extend along the X-axis, while the data lines 6 and the capacitance lines 8 extend along the Y-axis. Note that the capacitance lines 8 are not limited to a configuration of being along the Y-axis, but may have a configuration of being along the X-axis.

The pixel electrode 15, the TFT 30, and a capacitance element 16 are provided for each pixel P in a region demarcated by the scanning lines 3, the data lines 6, and the capacitance lines 8, and constitute a pixel circuit for the pixel P. Signal wiring such as the scanning lines 3, the data lines 6, and the capacitance lines 8 are provided in the wiring layer described above.

A scanning line 3 is electrically connected to a gate of the TFT 30 serving as a switching element. A data line 6 is electrically connected to a source/drain region on the data line side of the TFT 30. The scanning line 3 simultaneously controls the on and off of the TFTs 30 provided in the same row. A pixel electrode 15 is electrically connected to a source/drain region on the pixel electrode side of the TFT 30.

The data lines 6 are connected to the data line driving circuit 101 described above. The data lines 6 supply image signals supplied from the data line driving circuit 101 to the pixels P. Image signals may be line-sequentially supplied to each data line 6, or may be supplied to a plurality of adjacent data lines 6 on a group-by-group basis.

The scanning lines 3 are connected to the scanning line driving circuit 102 described above. The scanning lines 3 supply scanning signals supplied from the scanning line driving circuit 102 to the pixels P. Scanning signals are line-sequentially supplied to the scanning lines 3 in a pulse manner at a predetermined timing.

The input of a scanning signal turns on the TFT 30 for a certain period of time, and an image signal is applied to the pixel electrode 15 at a predetermined timing. The image signal is written in the liquid crystal layer 50 via the pixel electrode 15 at a predetermined level. The image signal is held for a certain period of time between the pixel electrode 15 and the common electrode 21 with the liquid crystal layer 50 sandwiched therebetween. At this time, the alignment state of the liquid crystal 50a changes depending on the voltage applied in accordance with the image signal. To prevent the image signal being held from leaking, the capacitance element 16 is electrically connected in parallel with liquid crystal capacitance provided between the pixel electrode 15 and the common electrode 21. The capacitance element 16 is provided in a layer between the TFT 30 and the capacitance line 8.

Figure 4:
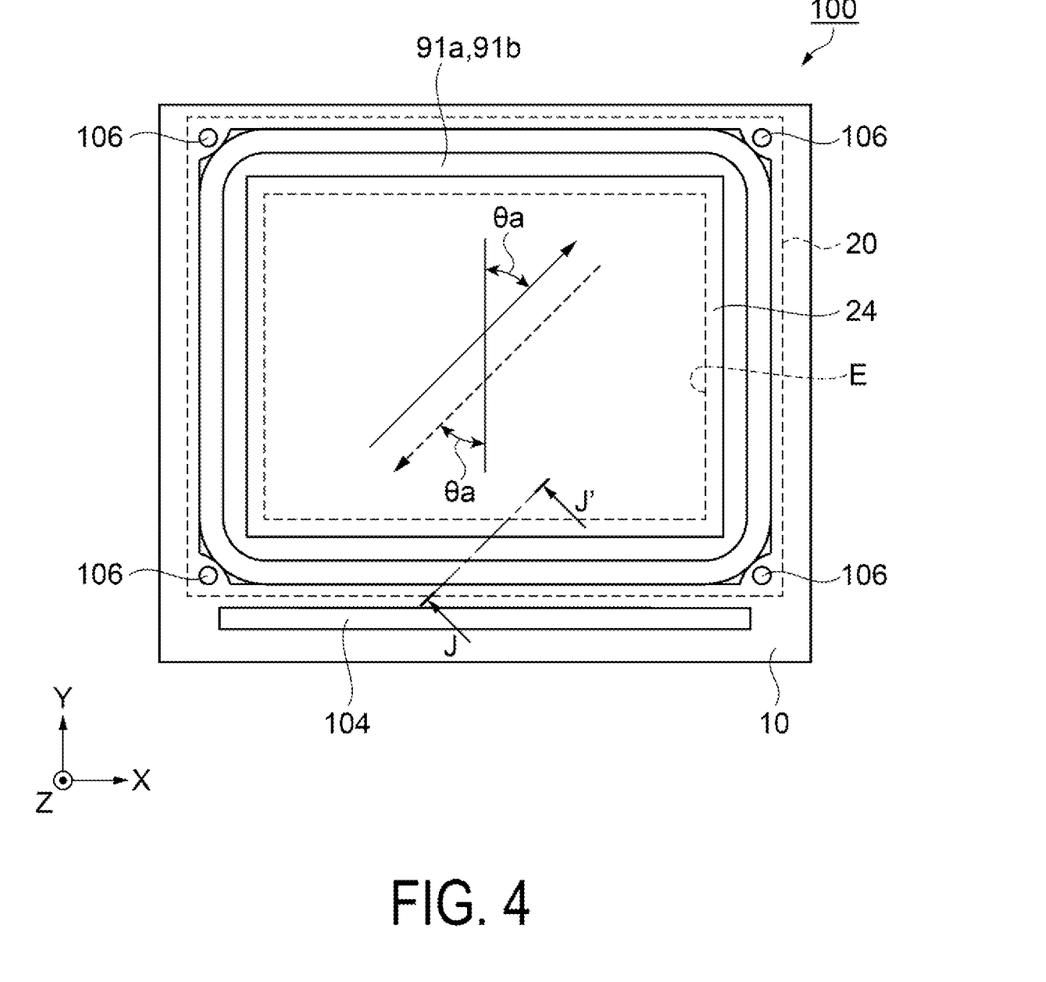
Figure 5:
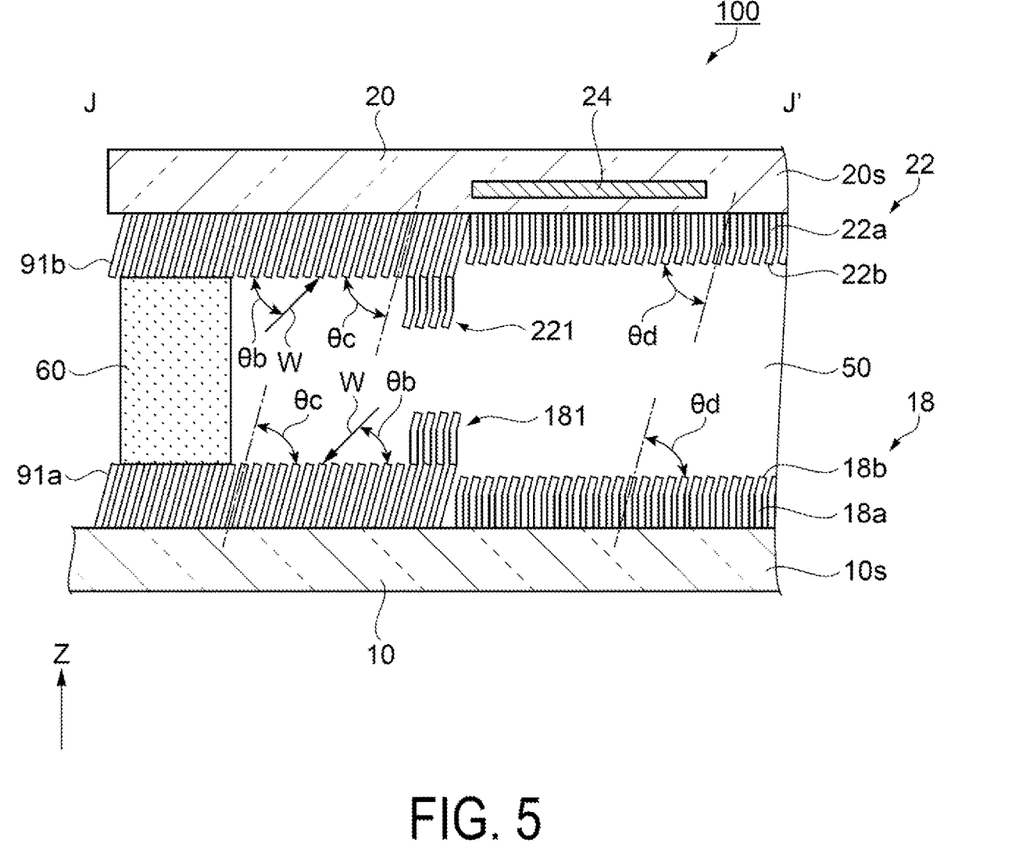

A configuration of the first adsorption film 91a, the second adsorption film 91b, the alignment films 18 and 22, and the like in the liquid crystal device 100 will be described with reference to FIGS. 4 and 5. In FIG. 4, the outer edge of the counter substrate 20 is illustrated by a dashed line. FIG. 5 includes a line segment J-J' in FIG. 4, and is a cross section orthogonal to the X-Y plane. The line segment J-J' is along the inclination direction of the pretilt of the liquid crystal 50a to be described later. In FIGS. 4 and 5, for ease of illustration, some configurations of the liquid crystal device 100 are omitted from illustration.

As illustrated in FIG. 4, the first adsorption film 91a and the second adsorption film 91b have a substantially rectangular frame shape in plan view. The first absorption film 91a and the second adsorption film 91b are on the outer side of the partition portion 24 and are disposed, in plan view, overlaid on each other. The first adsorption film 91a and the second adsorption film 91b, in plan view, overlap the sealing material 60, but do not overlap the partition portion 24.

As a result, the partition portion 24 is, in plan view, interposed between the first adsorption film 91a and the display region E and between the second adsorption film 91b and the display region E. Therefore, when the first absorption film 91a and the second absorption film 91b are formed, even if their positions are shifted due to variations in the process, the first adsorption film 91a and the second absorption film 91b remain within the region of the partition portion 24 and are prevented from reaching the display region E. Note that the first adsorption film 91a and the second adsorption film 91b may, in plan view, overlap the partition portion 24.

The outer edges of the first adsorption film 91a and the second adsorption film 91b are disposed along the outer edge of the counter substrate 20 while avoiding the vertical conduction portion 106. The sealing material 60, in plan view, overlaps the first adsorption film 91a and the second adsorption film 91b in all regions.

In the display region E, the inclination direction of the pretilt of the liquid crystal 50a (not illustrated) is set so that, for example, the azimuthal angle θa formed with the Y-axis is 45°. The inclination direction of the pretilt is defined by the vapor deposition direction used when forming the second vapor-deposited film 18b and the fourth vapor-deposited film 22b by diagonal vapor deposition. The vapor deposition direction will be described later.

In the display region E, the direction of the dashed arrow is a vapor deposition direction of diagonal vapor deposition of the second vapor-deposited film 18b relative to the element substrate 10, which is a direction from the upper right to the lower left. In addition, the direction of the solid arrow is a vapor deposition direction of diagonal vapor deposition of the fourth vapor-deposited film 22b relative to the counter substrate 20, which is a direction from the lower left to the upper right. Hereinafter, the azimuthal angle θa described above is also referred to as the inclination direction θa of the pretilt of the liquid crystal 50a. Note that the inclination direction θa of 45° is not limited to a direction including the lower left and the upper right of the display region E, and may be a direction including the upper left and the lower right.

The liquid crystal device 100 uses a polarizing element (not illustrated) disposed on the incident side and the emission side of the light L, respectively. The two polarizing elements are disposed in the liquid crystal device 100 so that the transmission axis or the absorption axis of one polarizing element is parallel to the X-axis or the Y-axis and the transmission axes or the absorption axes of the two polarizing elements are mutually orthogonal.

The vapor deposition direction of diagonal vapor deposition when forming the second vapor-deposited film 18b and the fourth vapor-deposited film 22b is caused to, in plan view, match the desired inclination direction of the pretilt of the liquid crystal 50a. In the present embodiment, the second vapor-deposited film 18b and the fourth vapor-deposited film 22b are disposed so that the azimuthal angle θa of the pretilt of the liquid crystal 50a intersects the transmission axes or the absorption axes of the two polarizing elements in the display region E at 45°. As a result, when a driving voltage is applied between the pixel electrode 15 and the common electrode 21 to drive the liquid crystal layer 50, the liquid crystal 50a collapses in the inclination direction of the pretilt, whereby a high transmittance is obtained.

When the pixel P is driven, the liquid crystal 50a substantially vertically aligned relative to the X-Y plane exhibits the behavior of being swung in the inclination direction θa. Therefore, the behavior by the liquid crystal 50a of moving toward the inclination direction θa, in other words, a flow is generated. In traditional liquid crystal devices, ionic impurities present in the liquid crystal layer 50 move in the liquid crystal layer 50 along the flow described above, and eventually stagnate in a corner of the inclination direction θa in the display region E. When ionic impurities stagnate, a stain-like defect due to uneven distribution of ion impurities easily occurs. In other words, stain-like defects in traditional liquid crystal devices tend to easily occur in the upper right corner and the lower left corner of the display region E.

As illustrated in FIG. 5, the sealing material 60 is in contact with the element substrate 10 via the first absorption film 91a, and is in contact with the counter substrate 20 via the second absorption film 91b. Therefore, the contact areas between the sealing material 60 and the first adsorption film 91a and between the sealing material 60 and the second adsorption film 91b is expanded. Since the first adsorption film 91a and the second adsorption film 91b have an ion adsorption property, diffusion of ionic impurities originating from the sealing material 60 into the liquid crystal layer 50 is further suppressed by the expansion of the contact areas.

The first adsorption film 91a includes a plurality of columns of which the long axis direction intersects the main surface of the element substrate 10, in other words, the X-Y plane at an angle θc. The long axis direction of the columns of the first adsorption film 91a intersects the direction along the Z-axis, which is the thickness direction of the liquid crystal layer 50, at an angle (90-θc)°. The angle θc is substantially 70°, for example.

The columns of the first adsorption film 91a are columnar crystal bodies of silicon oxide. The columns are formed by a vacuum vapor deposition method among physical vapor deposition (PVD) methods. Specifically, the columns of the first adsorption film 91a are formed by diagonally vapor depositing silicon oxide from a vapor deposition direction W intersecting the main surface of the element substrate 10 at an angle θb. In other words, the long axis direction of the columns is also the growth direction of the columnar crystals. Note that the angle θb does not necessarily match the angle θc. The angle θb is substantially 45°, for example. The first adsorption film 91a is provided before the alignment film 18 is formed relative to the element substrate 10.

The columns of the second adsorption film 91b are columnar crystal bodies of silicon oxide. The columns are formed by a vacuum vapor deposition method. Specifically, the columns of the second adsorption film 91b are formed by diagonally vapor depositing silicon oxide from the vapor deposition direction W intersecting the main surface of the counter substrate 20 at an angle θb. The second adsorption film 91b is provided before the alignment film 22 is formed relative to the counter substrate 20.

The first adsorption film 91a and the second adsorption film 91b are collections of a plurality of columns, and a gap exists between adjacent columns. Ion adsorption is expressed when ionic impurities originating from the sealing material 60 are captured in the gaps in the first absorption film 91a and the second absorption film 91b. The thicknesses of the first adsorption film 91a and the second adsorption film 91b are not particularly limited, but are substantially 70 nm, for example. Making the thicknesses of the first adsorption film 91a and the second adsorption film 91b thicker than the thicknesses of the second vapor-deposited film 18b and the fourth vapor-deposited film 22b causes the ion adsorption property to be sufficiently expressed.

Note that the first adsorption film 91a and the second adsorption film 91b also have an ion adsorption property relative to ionic impurities not originating from the sealing material 60. Examples of ionic impurities not originating from the sealing material 60 include, for example, those contained in the liquid crystal 50a, a deteriorated component of the liquid crystal 50a, and those mixed into the liquid crystal layer 50 in the manufacturing process of the liquid crystal device 100.

The alignment film 18 includes the first vapor-deposited film 18a and the second vapor-deposited film 18b. The second vapor-deposited film 18b faces the liquid crystal layer 50, and is disposed between the first vapor-deposited film 18a and the liquid crystal layer 50. The alignment film 22 includes the third vapor-deposited film 22a and the fourth vapor-deposited film 22b. The fourth vapor-deposited film 22b faces the liquid crystal layer 50, and is disposed between the third vapor-deposited film 22a and the liquid crystal layer 50.

The first vapor-deposited film 18a is vertically vapor-deposited and formed relative to the main surface of the element substrate 10 from the +Z direction. The first vapor-deposited film 18a includes a plurality of columns of which the long axis direction is along the Z-axis. The third vapor-deposited film 22a is vertically vapor-deposited and formed relative to the main surface of the counter substrate 20 from the −Z direction. The third vapor-deposited film 22a includes a plurality of columns of which the long axis direction is along the Z-axis.

In the element substrate 10, the first vapor-deposited film 18a is provided by a vacuum vapor deposition method after the first adsorption film 91a is formed. In the counter substrate 20, the third vapor-deposited film 22a is formed by a vacuum vapor deposition method after the second adsorption film 91b is formed. Silicon oxide, aluminum oxide, magnesium oxide, and the like are employed as the material for forming the first vapor-deposited film 18a and the third vapor-deposited film 22a.

The densities of the first vapor-deposited film 18a and the third vapor-deposited film 22a are greater than the densities of the second vapor-deposited film 18b and the fourth vapor-deposited film 22b. This is because, in vapor deposition from the vertical direction by a vacuum vapor deposition method, the energy of vapor deposition molecules is greater compared to that in the case of diagonal vapor deposition, and thus densification caused by rearranging the arrangement of vapor deposition molecules established at the time of formation easily occurs. As a result, the adhesion between the first vapor-deposited film 18a and the underlying layer in the element substrate 10, and the adhesion between the third vapor-deposited film 22a and the underlying layer in the counter substrate 20 are improved. The thicknesses of the first vapor-deposited film 18a and the third vapor-deposited film 22a are substantially 40 nm, for example.

The second vapor-deposited film 18b is, in plan view, disposed on and in contact with the first vapor-deposited film 18a. The second vapor-deposited film 18b includes a plurality of columns of which the long axis direction intersects the main surface of the element substrate 10 at an angle θd. The long axis direction of the columns of the second vapor-deposited film 18b intersects the thickness direction of the liquid crystal layer 50 at an angle (90−θd)°.

In the element substrate 10, the second vapor-deposited film 18b is provided after the first adsorption film 91a and the first vapor-deposited film 18a are formed. In the present embodiment, silicon oxide is employed as the material for forming the second vapor-deposited film 18b, and the columns described above are formed by diagonal vapor deposition using a vacuum vapor deposition method. The direction of the diagonal vapor deposition is the same direction as the vapor deposition direction W of the first adsorption film 91a. As a result, the angle θd is equal to the angle θc. As a result, the first adsorption film 91a and the second vapor-deposited film 18b can be formed by a similar method. Note that the angle θd is not limited to being equal to the angle θc.

The fourth vapor-deposited film 22b is, in plan view, disposed in the −Z direction of and in contact with the third vapor-deposited film 22a. The fourth vapor-deposited film 22b includes a plurality of columns of which the long axis direction intersects the main surface of the counter substrate 20 at an angle θd. The long axis direction of the columns of the fourth vapor-deposited film 22b intersects the thickness direction of the liquid crystal layer 50 at an angle (90−θd)°.

In the counter substrate 20, the fourth vapor-deposited film 22b is provided after the second adsorption film 91b and the third vapor-deposited film 22a are formed. In the present embodiment, silicon oxide is employed as the material for forming the fourth vapor-deposited film 22b, and the columns described above are formed by diagonal vapor deposition using a vacuum vapor deposition method. The direction of the diagonal vapor deposition is the same direction as the vapor deposition direction W of the second adsorption film 91b. As a result, the angle θd is equal to the angle θc. As a result, the second adsorption film 91b and the fourth vapor-deposited film 22b can be formed by a similar method. Note that the angle θd is not limited to being equal to the angle θc.

The pretilt angle of the liquid crystal 50a by the alignment films 18 and 22 is substantially 85° in the above-described form. Note that the inclination direction of the pretilt is appropriately set in accordance with the optical design of the liquid crystal device 100.

The thickness of the first adsorption film 91a is thicker than the thickness of the second vapor-deposited film 18b. The thickness of the second adsorption film 91b is thicker than the thickness of the fourth vapor-deposited film 22b. The thicknesses of the second vapor-deposited film 18b and the fourth vapor-deposited film 22b are substantially 20 nm, for example. Since the thickness of the first adsorption film 91a is thicker than the thickness of the second vapor-deposited film 18b and the thickness of the second adsorption film 91b is thicker than the thickness of the fourth vapor-deposited film 22b, the ion adsorption property of the first adsorption film 91a and the second adsorption film 91b can be improved.

An end 181, which is a portion of the alignment film 18, is disposed on top of the first adsorption film 91a. The end 181 is formed by causing the region in which the alignment film 18 is formed to, in plan view, overlap the first adsorption film 91a. Therefore, the end 181 is disposed protruding upward of the first adsorption film 91a.

An end 221, which is a portion of the alignment film 22, is disposed on top of the second adsorption film 91b. The end 221 is formed by causing the region in which the alignment film 22 is formed to, in plan view, overlap the second adsorption film 91b. Therefore, the end 221 is disposed protruding in the −Z direction of the second adsorption film 91b.

The end 181 is on the first adsorption film 91a and acts like a wall. The end 221 is on the second adsorption film 91b and acts like a wall as well. Therefore, the ends 181 and 221 make it less likely for ionic impurities eluting from the sealing material 60 into the liquid crystal layer 50 to diffuse into the display region E. As a result, display defects due to ionic impurities can be further reduced.

From the viewpoint of ensuring the ion adsorption property of the first adsorption film 91a and the second absorption film 91b, the end 181 may be on top of a limited portion of the first absorption film 91*a*, and the end 221 may be on top of a limited portion of the second adsorption film 91*b*. In other words, the surfaces of the first adsorption film 91*a* and the second adsorption film 91*b* may face the liquid crystal layer 50. Note that the ends 181 and 221 may be omitted.

The surfaces of the element substrate 10 and the counter substrate 20 may be subjected to a surface treatment by a silane coupling agent. Specifically, a silane coupling agent is used to form an organopolysiloxane film on the surfaces of the second vapor-deposited film 18*b* of the element substrate 10 and the fourth vapor-deposited film 22*b* of the counter substrate 20.

Silanol groups are bonded to silicon oxide of the second vapor-deposited film 18*b* and the fourth vapor-deposited film 22*b* for dehydration condensation, whereby the silane coupling agent turns into an organopolysiloxane film with hydrophobic groups aligned on the surface side. This surface treatment causes the surfaces of the second vapor-deposited film 18*b* and the fourth vapor-deposited film 22*b* to have a larger contact angle with water, making it possible to improve the light resistance of the liquid crystal device 100. The surface treatment by the silane coupling agent may be applied to the surfaces of the first adsorption film 91*a* and the second adsorption film 91*b*. A known method can be employed as the method of surface treatment by the silane coupling agent.

According to the present embodiment, the following advantages can be obtained.

Diffusion of ionic impurities eluting from the sealing material 60 into the liquid crystal layer 50 can be suppressed. Specifically, the first adsorption film 91*a* that is thicker than the second vapor-deposited film 18*b* and that has an ion adsorption property, and the second adsorption film 91*b* that is thicker than the fourth vapor-deposited film 22*b* and that has an ion adsorption property are disposed in contact with the sealing material 60. Therefore, even if the thickness of the first vapor-deposited film 18*a* is thicker than the thickness of the second vapor-deposited film 18*b* and the thickness of the third vapor-deposited film 22*a* is thicker than the thickness of the fourth vapor-deposited film 22*b*, ionic impurities originating from the sealing material 60 are easily adsorbed by the first adsorption film 91*a* and the second adsorption film 91*b*. As a result, diffusion of ionic impurities in the liquid crystal layer 50 is restrained. In other words, the liquid crystal device 100 that suppresses diffusion of ionic impurities in the liquid crystal layer 50 can be provided.

2. Second Embodiment

In the present embodiment, an active drive-type liquid crystal device including a TFT will be illustrated as an example of an electro-optical device. A liquid crystal device 200 according to the present embodiment differs from the liquid crystal device 100 of the first embodiment in terms of the planar shapes of the first adsorption film and the second adsorption film. In the description below, the same components as those in the first embodiment will be given the same reference signs, and redundant descriptions of these components will be omitted.

Figure 6:
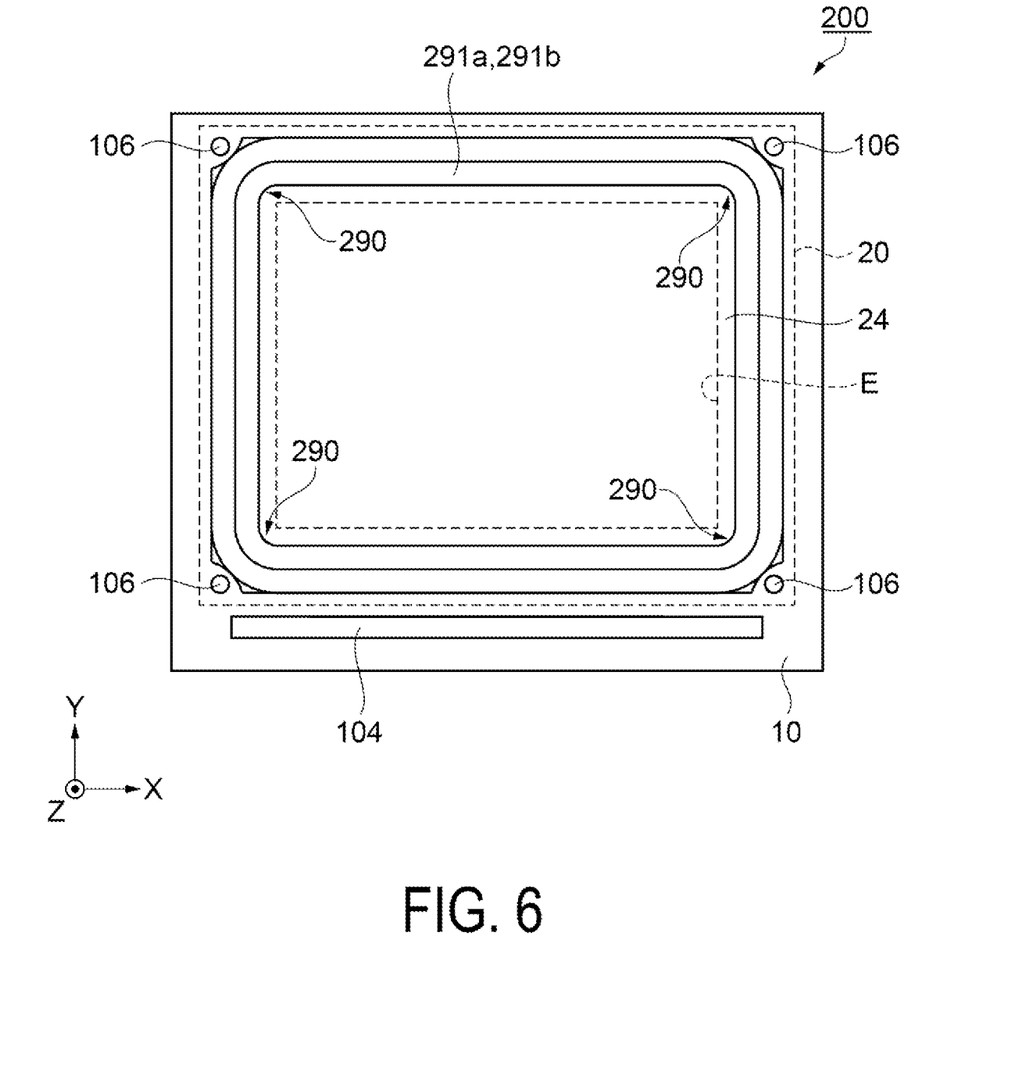
FIG. 6 is a schematic plan view illustrating a disposition of a first adsorption film, a second adsorption film, and the like according to a second embodiment.

A configuration of the liquid crystal device 200 according to the present embodiment will be described with reference to FIG. 6. In FIG. 6, for ease of illustration, the outer edge of the counter substrate 20 is illustrated by a dashed line; in addition, some configurations of the liquid crystal device 200 are omitted from illustration. Note that in the description of FIG. 6 below, unless otherwise indicated, a state in which the liquid crystal device 200 is viewed in plan view is described.

As illustrated in FIG. 6, the liquid crystal device 200 includes the element substrate 10 as the first substrate, the counter substrate 20 as the second substrate, and the liquid crystal layer 50 (not illustrated). The element substrate 10 includes the alignment film 18 as the first alignment film (not illustrated), and a first adsorption film 291*a* disposed in contact with the sealing material 60. The counter substrate 20 includes the alignment film 22 as the second alignment film (not illustrated), and a second adsorption film 291*b* disposed in contact with the sealing material 60.

The first adsorption film 291*a* and the second adsorption film 291*b* have an ion adsorption property, and each include columns of which the long axis direction intersects the thickness direction of the liquid crystal layer 50. The thickness of the first adsorption film 291*a* is thicker than the thickness of the second vapor-deposited film 18*b* (not illustrated) of the alignment film 18. The thickness of the second adsorption film 291*b* is thicker than the thickness of the fourth vapor-deposited film 22*b* (not illustrated) of the alignment film 22.

The first adsorption film 291*a* and the second adsorption film 291*b* have a substantially rectangular frame shape. The first absorption film 291*a* and the second adsorption film 291*b* are on the outer side of the partition portion 24 and are disposed overlaid on each other. The first absorption film 91*a* and the second absorption film 91*b* of the first embodiment have a rectangular inner edge. In contrast, a curved portion 290 is provided in each of the four corners of the inner edge of the first absorption film 291*a* and the second adsorption film 291*b*. In this respect, the liquid crystal device 200 differs from the liquid crystal device 100 of the first embodiment.

The first absorption film 91*a* and the second absorption film 91*b*, in plan view, overlap the sealing material 60, and also overlap the partition portion 24 at the four curved portions 290. Other configurations of the liquid crystal device 200 are similar to those of the liquid crystal device 100 of the first embodiment.

According to the present embodiment, the following advantages can be obtained in addition to the advantages of the first embodiment. The four curved portions 290 expand the areas of the first adsorption film 291*a* and the second adsorption film 291*b* at the four corners of the outer edge of the display region E. Therefore, diffusion of ionic impurities eluting from the sealing material 60 into the liquid crystal layer 50 can be further suppressed.

3. Third Embodiment

In the present embodiment, an active drive-type liquid crystal device including a TFT will be illustrated as an example of an electro-optical device. A liquid crystal device 300 according to the present embodiment differs from the liquid crystal device 100 of the first embodiment in terms of the planar shapes of the first adsorption film and the second adsorption film. In the description below, the same components as those in the first embodiment will be given the same reference signs, and redundant descriptions of these components will be omitted.

Figure 7:
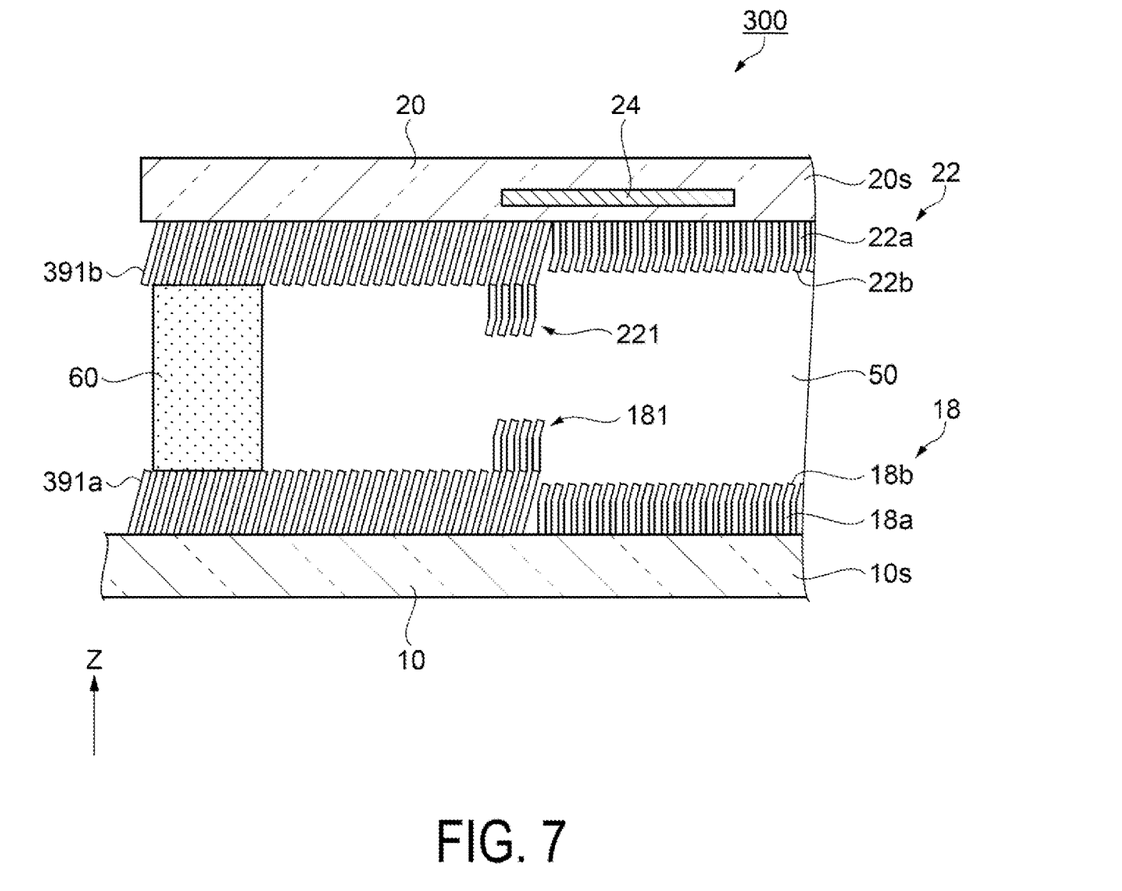
FIG. 7 is a schematic cross-sectional view illustrating a disposition of a first adsorption film, a second adsorption film, and the like according to a third embodiment.

A configuration of the liquid crystal device 300 according to the present embodiment will be described with reference to FIG. 7. FIG. 7 illustrates a cross section of the liquid crystal device 300 corresponding to that of the first embodiment in FIG. 5. In addition, for ease of illustration, some configurations of the liquid crystal device 300 are omitted from illustration.

As illustrated in FIG. 7, the liquid crystal device 300 includes the element substrate 10 as the first substrate, the counter substrate 20 as the second substrate, and the liquid crystal layer 50. The element substrate 10 includes the alignment film 18 as the first alignment film, and a first adsorption film 391a disposed in contact with the sealing material 60. The counter substrate 20 includes the alignment film 22 as the second alignment film, and a second adsorption film 391b disposed in contact with the sealing material 60.

The first adsorption film 391a and the second adsorption film 391b have an ion adsorption property, and each include columns of which the long axis direction intersects the thickness direction of the liquid crystal layer 50. The thickness of the first adsorption film 391a is thicker than the thickness of the second vapor-deposited film 18b of the alignment film 18. The thickness of the second adsorption film 391b is thicker than the thickness of the fourth vapor-deposited film 22b of the alignment film 22.

The first adsorption film 391a and the second adsorption film 391b have a substantially rectangular frame shape in plan view. The first absorption film 391a and the second adsorption film 391b are on the outer side of the partition portion 24 and are disposed overlaid on each other. The first adsorption film 391a and the second adsorption film 391b, in plan view, overlap the sealing material 60.

The inner edges of the first adsorption film 391a and the second adsorption film 391b are, in plan view, extended to the display region E (not illustrated) side. In this respect, the liquid crystal device 300 differs from the liquid crystal device 100 of the first embodiment. As a result, the first adsorption film 391a and the second adsorption film 391b, in plan view, overlap the outer edge side of the partition portion 24. Other configurations of the liquid crystal device 300 are similar to those of the liquid crystal device 100 of the first embodiment.

According to the present embodiment, the following advantages can be obtained in addition to the advantages of the first embodiment. Since the first adsorption film 391a and the second adsorption film 391b are disposed so that their planar areas expand to the display region E side, ionic impurities originating from the sealing material 60 and the like are further easily adsorbed. As a result, diffusion of ionic impurities can be further suppressed.

4. Fourth Embodiment

A projection-type display device 1000 will be illustrated as an example of an electronic apparatus according to the present embodiment.

Figure 8:
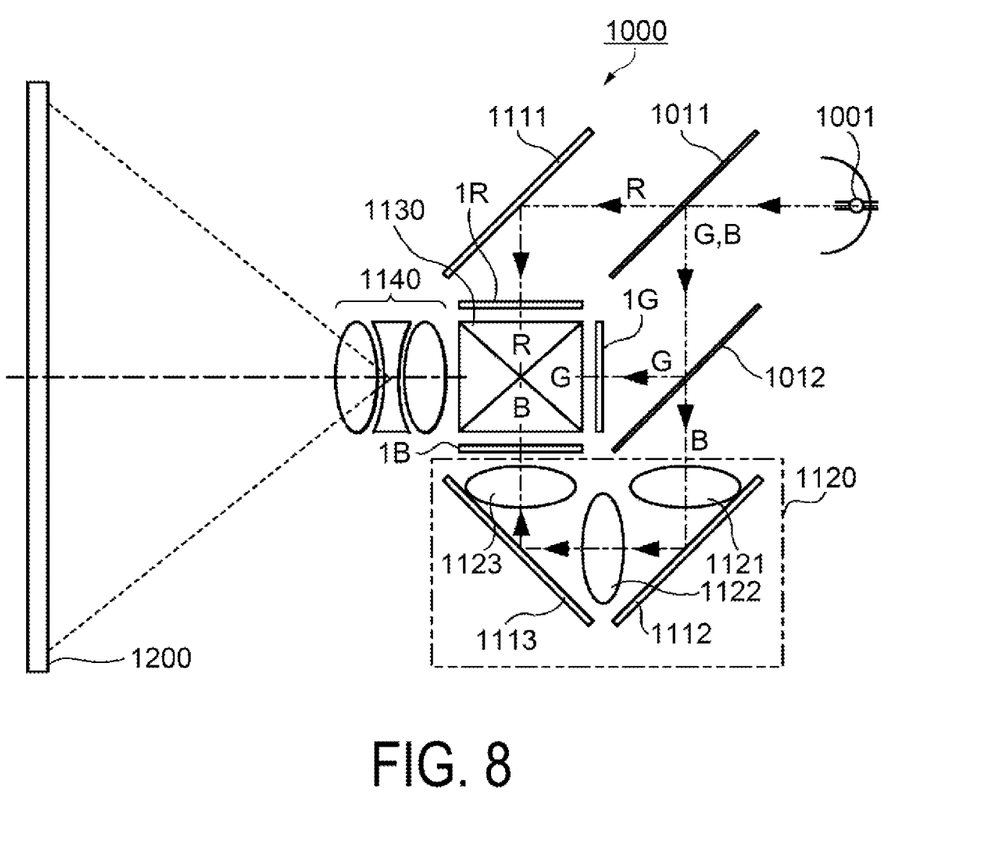
FIG. 8 is a schematic view illustrating a configuration of a projection-type display device as an electronic apparatus according to a fourth embodiment.

As illustrated in FIG. 8, the projection-type display device 1000 includes a lamp unit 1001, a dichroic mirrors 1011 and 1012 of a color separation optical system, three liquid crystal devices 1B, 1G, and 1R, reflecting mirrors 1111, 1112, and 1113, relay lenses 1121, 1122, and 1123, a dichroic prism 1130 of a color synthesis optical system, and a projection lens 1140 of a projection optical system.

The lamp unit 1001 is, for example, a discharge-type light source. The method of the light source is not limited thereto. A solid light source such as a light emitting diode and a laser may be employed.

The light emitted from the lamp unit 1001 is separated by the dichroic mirrors 1011 and 1012 into color light of three colors, each of the color light having a different wavelength range. The color light of three colors is red light R that is substantially red, green light G that is substantially green, and blue light B that is substantially blue.

The dichroic mirror 1011 transmits the red light R, and reflects the green light G and the blue light B having a shorter wavelength than that of the red light R. The red light R transmitted through the dichroic mirror 1011 is reflected by the reflecting mirror 1111 to be incident on the liquid crystal device 1R. The green light G reflected by the dichroic mirror 1011 is reflected by the dichroic mirror 1012 to be incident on the liquid crystal device 1G. The blue light B reflected by the dichroic mirror 1011 is transmitted through the dichroic mirror 1012 to be incident on a relay lens system 1120.

The relay lens system 1120 includes relay lenses 1121, 1122, and 1123, and reflecting mirrors 1112 and 1113. Since it has a longer optical path compared to those of the green light G and the red light R, the blue light B tends to have a large luminous flux. Therefore, the relay lens 1122 is used to restrain expansion of the luminous flux. The blue light B incident on the relay lens system 1120 is converged by the relay lens 1121, is reflected by the reflecting mirror 1112, and converges in the vicinity of the relay lens 1122. Then, following the reflective mirror 1113 and the relay lens 1123, the blue light B is incident on the liquid crystal device 1B.

To the liquid crystal devices 1R, 1G, and 1B, which serve as light modulating devices in the projection-type display device 1000, liquid crystal device serving as an electro-optical device according to the above-described embodiments is applied. It is sufficient that the liquid crystal device according to the above-described embodiments is applied to one or more of the liquid crystal devices 1R, 1G, and 1B. The liquid crystal device according to the above-described embodiments may be applied to all of the liquid crystal devices 1R, 1G, and 1B.

Each of the liquid crystal devices 1R, 1G, and 1B is electrically connected to an upper circuit of the projection-type display device 1000. Accordingly, when the respective image signals specifying the gray scale level of the red light R, the green light G, and the blue light B are supplied from an external circuit to the upper circuit and processed, the liquid crystal devices 1R, 1G, and 1B are driven to modulate each of the color light.

The red light R, the green light G, and the blue light B modulated by the liquid crystal devices 1R, 1G, and 1B are incident on the dichroic prism 1130 from three directions. The dichroic prism 1130 synthesizes the red light R, the green light G, and the blue light B incident thereon. In the dichroic prism 1130, the red light R and the blue light B are reflected by 90 degrees, while the green light G is transmitted. As a result, the red light R, the green light G, and the blue light B are synthesized as display light for displaying a color image and are incident on the projection lens 1140.

The projection lens 1140 is disposed facing the outside of the projection-type display device 1000. The display light is expanded and emitted via the projection lens 1140. A projection image is projected onto a screen 1200 serving as a projection target.

In the present embodiment, a projection-type display device 1000 has been illustrated as an example of an electronic apparatus. However, the present disclosure is not limited thereto. The electro-optical device according to the present disclosure may be applied to electronic apparatuses such as, for example, a projection-type head-up display (HUD), a direct view-type head-mounted display (HMD), a personal computer, a digital camera, and liquid crystal television.

According to the present embodiment, diffusion of ionic impurities in the liquid crystal layer 50 is suppressed, and thus the display quality of the liquid crystal devices 1R, 1G, and 1B is improved. Therefore, a projection-type display device 1000 having excellent projection image quality can be provided.

What is claimed is:

1. An electro-optical device comprising:
 a first substrate;
 a second substrate disposed opposite to the first substrate, and including a partition portion surrounding a display region;
 a sealing material disposed between the first substrate and the second substrate; and
 a liquid crystal layer disposed on an inner side of the sealing material and containing liquid crystal; wherein
 the first substrate includes
  a first alignment film configured to align the liquid crystal and
  an ion-adsorbing first adsorption film disposed in contact with the sealing material and has a frame shape surrounding outside the partition portion in plan view,
 the first alignment film includes
  a first vapor-deposited film and
  a second vapor-deposited film disposed between the first vapor-deposited film and the liquid crystal layer,
 the second vapor-deposited film and the first adsorption film include a column of which a long axis direction intersects a thickness direction of the liquid crystal layer,
 a thickness of the first adsorption film is thicker than a thickness of the second vapor-deposited film, and
 an end of the first alignment film is disposed on an inner end of the first adsorption film.

2. The electro-optical device according to claim 1, wherein the sealing material is in contact with the first substrate via the first adsorption film.

3. The electro-optical device according to claim 1, wherein
 the column of the first adsorption film contains silicon oxide,
 the thickness of the first adsorption film is substantially 70 nm, and
 the thickness of the second vapor-deposited film is substantially 20 nm.

4. The electro-optical device according to claim 3, wherein
 a thickness of the first vapor-deposited film is substantially 40 nm and
 a density of the first vapor-deposited film is greater than a density of the second vapor-deposited film.

5. The electro-optical device according to claim 1, wherein the sealing material contains resin having curability.

6. The electro-optical device according to claim 1, wherein
 the second substrate includes
 a second alignment film configured to align the liquid crystal and
 an ion-adsorbing second adsorption film disposed in contact with the sealing material,
 the second alignment film includes
 a third vapor-deposited film and
 a fourth vapor-deposited film disposed between the third vapor-deposited film and the liquid crystal layer,
 the fourth vapor-deposited film and the second adsorption film include a column of which a long axis direction intersects the thickness direction of the liquid crystal layer, and
 a thickness of the second adsorption film is thicker than a thickness of the fourth vapor-deposited film.

7. The electro-optical device according to claim 1, wherein
 the first adsorption film and the partition portion do not overlap in plan view.

8. The electro-optical device according to claim 1, wherein the end of the first alignment film is disposed on top of the first adsorption film.

9. An electronic apparatus comprising the electro-optical device according to claim 1.

10. The electro-optical device according to claim 1, wherein a thickness of the first vapor-deposited film is thicker than the thickness of the second vapor-deposited film.

11. The electro-optical device according to claim 1, wherein the column of the first adsorption film contains silicon oxide.

* * * * *